(12) United States Patent  
Hentges et al.

(10) Patent No.: US 7,959,230 B2  
(45) Date of Patent: Jun. 14, 2011

(54) SEATING SYSTEM FOR A VEHICLE

(75) Inventors: William J. Hentges, Plymouth, MI (US); Vasile E. Bozinton, Farmington Hills, MI (US); Tod A. Shivak, Ypsilanti, MI (US); Srinivasa N. Sanku, Canton, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 10/820,624

(22) Filed: Apr. 8, 2004

(65) Prior Publication Data

US 2004/0262971 A1     Dec. 30, 2004

Related U.S. Application Data

(60) Provisional application No. 60/462,459, filed on Apr. 11, 2003.

(51) Int. Cl.  
*B60N 2/20* (2006.01)

(52) U.S. Cl. ................................. 297/378.12

(58) Field of Classification Search ............. 297/378.12, 297/378.14; 296/65.16, 65.17, 65.18  
See application file for complete search history.

(56) References Cited

U.S. PATENT DOCUMENTS

| | | | | |
|---|---|---|---|---|
| 5,433,507 | A | * | 7/1995 | Chang ........................... 297/367 |
| 5,597,206 | A | * | 1/1997 | Ainsworth et al. ...... 297/378.12 |
| 5,957,522 | A | * | 9/1999 | Matsuhashi et al. ............ 296/66 |
| 6,007,153 | A | * | 12/1999 | Benoit et al. ............. 297/378.12 |
| 6,068,341 | A | * | 5/2000 | Rink .............................. 297/483 |
| 6,152,533 | A | * | 11/2000 | Smuk ............................ 297/341 |
| 6,231,101 | B1 | * | 5/2001 | Kamida et al. .................. 296/63 |
| 6,341,820 | B1 | * | 1/2002 | Kimura et al. ............ 297/378.13 |
| 6,464,299 | B1 | * | 10/2002 | Castagna ................. 297/378.12 |
| 6,659,557 | B2 | * | 12/2003 | Deptolla ....................... 297/367 |
| 7,137,667 | B2 | * | 11/2006 | Habedank ................ 297/378.12 |
| 2003/0006637 | A1 | * | 1/2003 | Jach et al. .................... 297/336 |
| 2003/0080601 | A1 | * | 5/2003 | Charras et al. ........... 297/378.12 |

* cited by examiner

*Primary Examiner* — David Dunn  
*Assistant Examiner* — Noah Chandler Hawk  
(74) *Attorney, Agent, or Firm* — Butzel Long

(57) ABSTRACT

A positioning system is provided for moving a seat back in a vehicle between a seating position and a cargo storage position. The positioning system includes a release mechanism actuatable between a first position to permit movement of the seat back and a second position to prevent movement of the seat back. A first actuator is provided on the seat back near an upper corner of the seat back and a second actuator is provided on the seat back near a lower corner of the seat back, so that the seat back can be moved from the cargo storage position to the seating position by a person actuating the first actuator from a location alongside the vehicle and by a person actuating the second actuator from a location behind the vehicle.

17 Claims, 3 Drawing Sheets

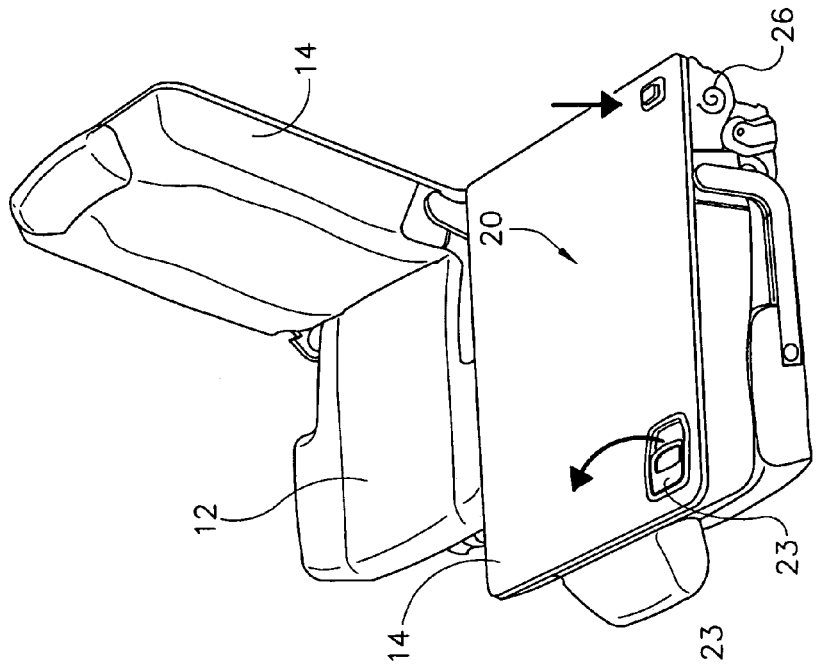
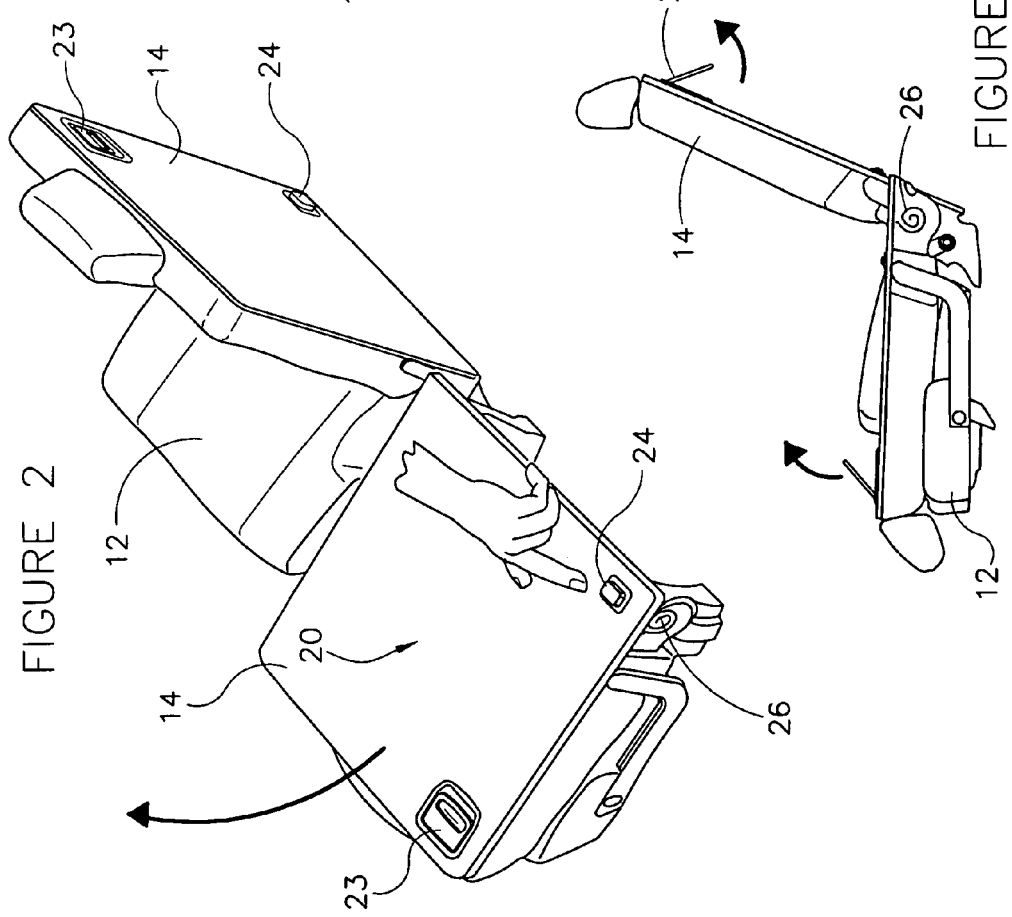

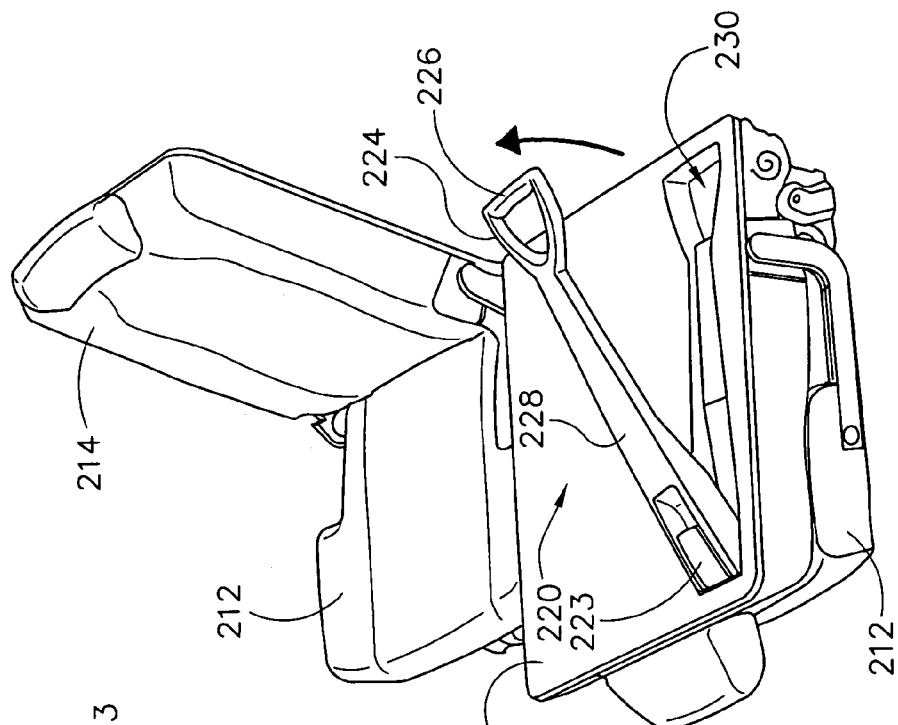
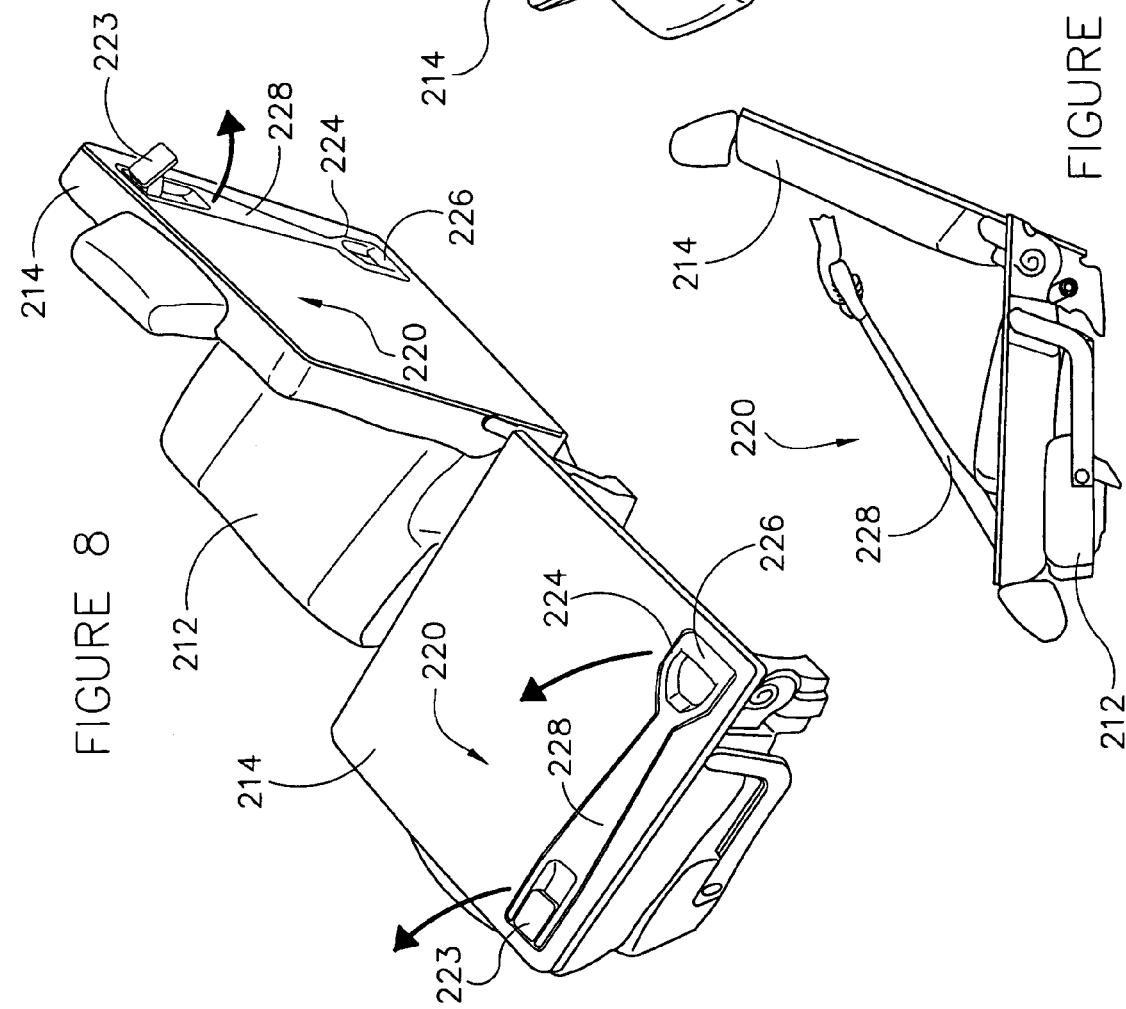

SEATING SYSTEM FOR A VEHICLE

CROSS REFERENCE TO RELATED APPLICATIONS

The present application claims the benefit of priority as available under 35 U.S.C. §119(e)(1) of U.S. Provisional Patent Application No. 60/462,459 filed on Apr. 11, 2003 (the entire disclosure of which is incorporated by reference herein).

FIELD

The present invention relates to a seating system for a vehicle capable of movement between a seating position and a stowed position. The present invention relates more particularly to a seating system for a vehicle having a positioning system for moving the seat between a stowed position and a seating position. The present invention relates more particularly to a seating system having a positioning system that is accessible from a side location and a rear location of the vehicle.

BACKGROUND

Seating systems for vehicles having a seat bottom and a seat back are generally known. Such known seating systems may also be configured for movement of the seat back between a generally upright seating position and a generally horizontal stowed position, such as for providing additional cargo storage space. Such known seating systems typically include a latch mechanism for locking the seat back in the seating position and for releasing the seat back for movement to the stowed position when additional cargo storage space is desired.

However, such known seating systems typically require a user to manually activate a latch on the seat back and grasp a portion of the seat back (e.g. a cushion, a headrest or trim piece, etc.) in order to move the seat back from the stowed position to the seating position. The need to reach the latch and/or to grasp a portion of the seat back often requires the user to lean or bend over or otherwise configure their body in a cumbersome, uncomfortable or inconvenient position in order to reach the seat back and to obtain the necessary leverage to move the seat back from the stowed position to the seating position. For example, in applications such as rear or third row seating for vehicles such as a minivan or sport utility vehicle it may be difficult for a user at a rear location of the vehicle, such as from a tailgate or lift gate, to reach the top of the seat back.

Accordingly, it would be advantageous to provide a seating system for a vehicle that is capable of movement between a seating position and a stowed position. It would also be advantageous to provide a seating system for a vehicle having a seat back that is capable of movement between a generally upright seating position and a generally horizontal stowed position. It would be further advantageous to provide a seating system for a vehicle having a positioning system that is conveniently accessible for movement of the seat from the stowed position to the seating position. It would be further advantageous to provide a seating system having a positioning system that is conveniently accessible from a tailgate area of a vehicle. It would be further advantageous to provide a seating system that is conveniently accessible from a side location of the vehicle. It would be further advantageous to provide a seating system having a positioning system that improves the leverage of a user in moving the seat from the stowed position to the seating position.

Accordingly, it would be advantageous to provide a seating system having any one or more of these or other advantageous features.

SUMMARY

The present invention relates to a seating system for a vehicle. The seating system has a seat bottom and a seat back interconnected in a pivoting manner so that the seat back is configured for movement between a generally upright seating position and a generally horizontal stowed position. A positioning system is configured to move the seat back between the seating position and the stowed position and configured for actuation by a user from at least one of a side portion of the vehicle and a rear portion of the vehicle.

The present invention also relates to a positioning system for moving a seat back in a vehicle between a seating position and a cargo storage position. A release mechanism is provided for actuation between a first position to permit movement of the seat back and a second position to prevent movement of the seat back. A first actuator is provided on the seat back proximate an upper corner of the seat back and a second actuator is provided on the seat back proximate a lower corner of the seat back, so that the seat back can be moved from the cargo storage position to the seating position by a person actuating the first actuator from a location alongside the vehicle and by a person actuating the second actuator from a location behind the vehicle.

The present invention further relates to a system for moving a seat back in a vehicle between a cargo storage position and a seating position. A first actuator is provided near an upper corner of the seat back and a second actuator is provided near a lower corner of the seat back. The first actuator is configured to be actuated by a user from a side of the vehicle and the second actuator is configured to be actuated by a user from a rear of the vehicle, so that the seat back may be moved from the cargo storage position to the seating position by a user located at either the side or the rear of the vehicle.

BRIEF DESCRIPTION OF THE DRAWINGS

FIG. 1 is a schematic representation of a front perspective view of a seating system for a vehicle having a positioning system according to one embodiment.

FIG. 2 is a schematic representation of a rear perspective view of the embodiment of a seating system for a vehicle having a positioning system of FIG. 1.

FIG. 3 is a schematic representation of a side view of the embodiment of a seating system for a vehicle having a positioning system of FIG. 1.

FIG. 7 is a perspective view of a seating system for a vehicle having a positioning system according to a further embodiment.

FIG. 8 is a schematic representation of a rear perspective view of the embodiment of a seating system for a vehicle having a positioning system of FIG. 7.

FIG. 9 is a schematic representation of a side view of the embodiment of a seating system for a vehicle having a positioning system of FIG. 7.

DETAILED DESCRIPTION

Figure 4:
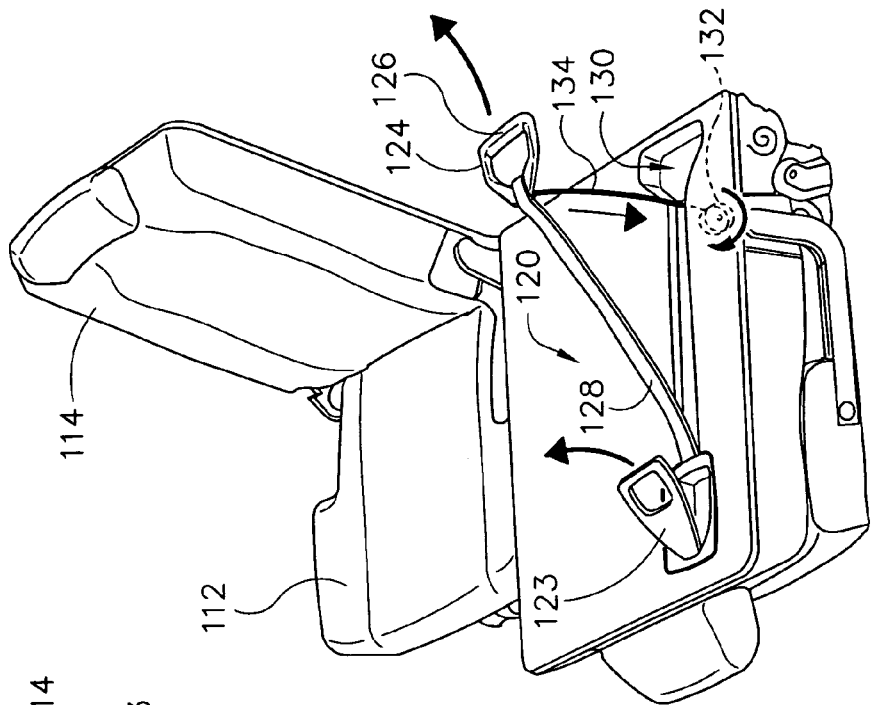
FIG. 4 is a schematic representation of a front perspective view of a seating system for a vehicle having a positioning system according to another embodiment.

The seating system is shown and described for individual or "bucket" type seating in an automobile, but is equally applicable to other seating types such as "bench" type seats, "40/60 split" type seats, etc. and for use in any type of vehicle.

Referring to FIGS. 1-3, a seating system for a vehicle is shown according to one embodiment. The seating system includes a vehicle seat of a foldable type having a seat bottom 12, a seat back 14, and a positioning system 20. Positioning system 20 includes a release mechanism (e.g. recliner, latch, catch, lever, etc.), a first actuator 23 (shown schematically as a handle member) and a second actuator 24 (shown schematically as a "pushbutton"), and a biasing device (shown schematically as a spring 26). Seat back 14 is pivotally coupled to seat bottom 12 by a pivoting device of a conventional type for movement of the seat back between a generally upright seating position and a generally horizontal storage position (such as for providing a cargo storage space within the vehicle). The release mechanism of positioning system 20 is configured to maintain the seat back in a selected position relative to the seat bottom (e.g. a seating position, a stowed position, etc.). According to a preferred embodiment, first actuator 23 permits a user to position the seat back from a side area of the vehicle (e.g. through a side door, sliding door, from an adjacent seat, etc.). First actuator 23 is shown in FIGS. 1-3 as a pivotally-operated handle located near a top corner of a rear or back panel of seat back 14, and is configured to engage the release mechanism (e.g. for a seat pivoting device of a conventional type, etc.) so that the seat back is locked in position when the release mechanism is in a first position (e.g. "locked," "recessed," etc.) and to release the seat back for pivotal movement of the seat back relative to the seat bottom when the release mechanism is in a second position (e.g. "released," "extended," etc.). The release mechanism may be configured for mechanical, electrical, or electromechanical operation. Spring 26 is intended to provide a biasing force on the seat back that tends to move the seat back from the stowed position to the upright position when the release mechanism is released by first actuator 23. The location of first actuator 23 near an upper corner of the seat back permits the seat back to be conveniently accessed for positioning by a user from a side area of the vehicle or from an adjacent seat within the vehicle. According to alternative embodiments, the first actuator may be any suitable device such as a slide-type device or a rotary-type device, and may be located on a side panel of the seat back or other suitable location.

Referring further to FIGS. 1-3, second actuator 24 is intended to permit a user to position the seat back between the stowed position and an upright position from a rear location of the vehicle. Actuator 24 is located near a lower portion of seat back 14 so that it is conveniently accessible to a user from the rear of the vehicle (such as through an open tailgate, lift gate, etc.) when the seatback is in either the stowed position and upright positions. Actuator 24 (shown as a pushbutton or other touch-sensitive or touch-activated device) is configured to engage the release mechanism so that the seat back is locked in position when the actuator is in a first position (e.g. "locked," "extended," etc.) and to release the seat back for pivotal movement of the seat back when the actuator is in a second position (e.g. "released," "depressed," etc.). Spring 26 provides a biasing force on seat back 14 that tends to move the seat back from the stowed position to the upright position when actuator 24 is released. According to an alternative embodiment, the actuator may be any suitable device, such as a lever, handle, knob, etc.

Figure 5:
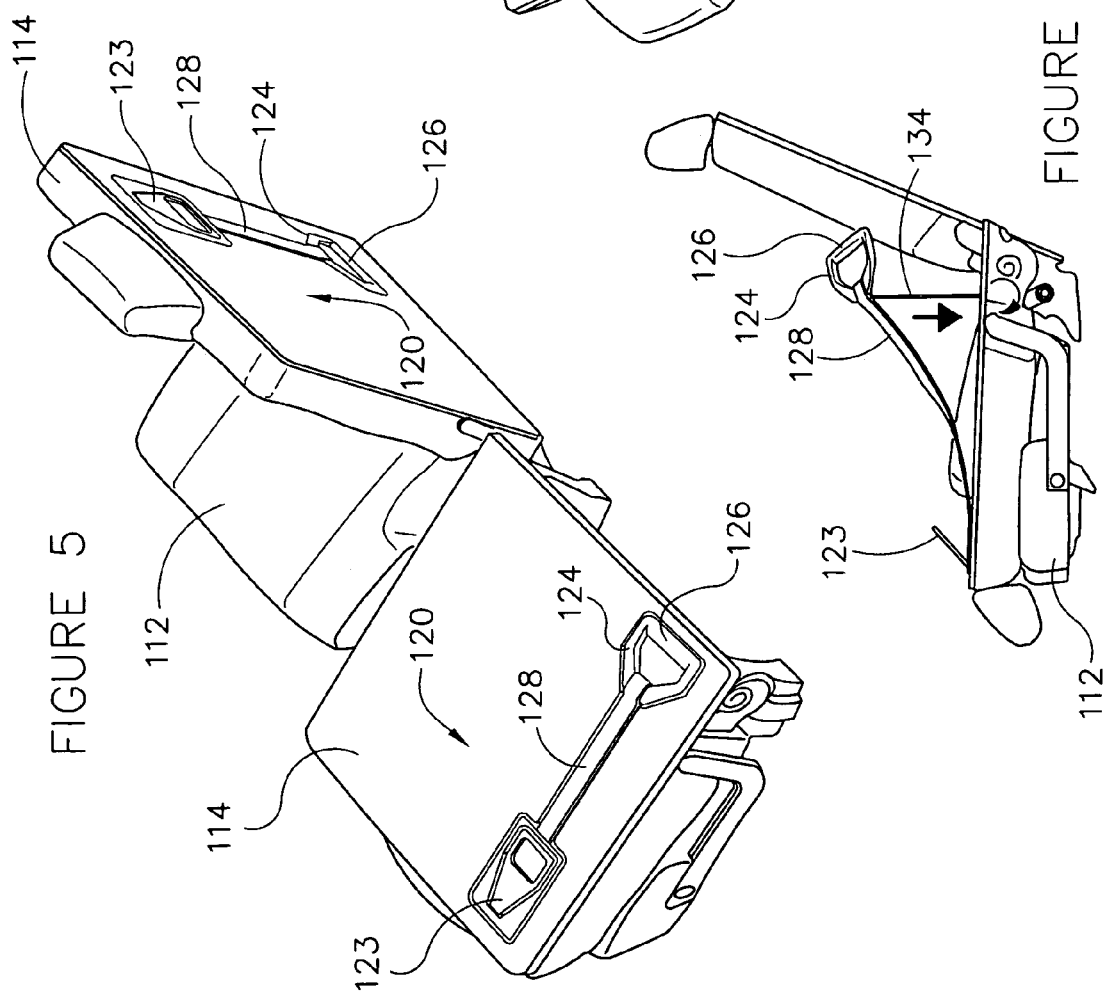
FIG. 5 is a schematic representation of a rear perspective view of the embodiment of a seating system for a vehicle having a positioning system of FIG. 4.
Figure 6:
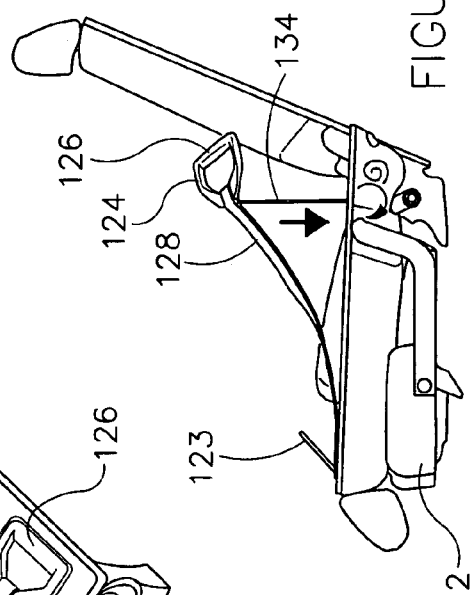
FIG. 6 is a schematic representation of a side view of the embodiment of a seating system for a vehicle having a positioning system of FIG. 4.

Referring to FIGS. 4-6, a seating system for a vehicle is shown according to another embodiment. The seating system includes a seat bottom 112, a seat back 114, and a positioning system 120. Positioning system 120 includes a release mechanism (e.g. recliner, latch, catch, lever, etc.), and a first actuator 123 (shown schematically as a handle member) and a second actuator 124 (shown schematically as a "stirrup," gripping member or handle device 126). Seat back 114 is pivotally coupled to seat bottom 112 for movement between a generally upright seating position and a generally horizontal storage position (such as for providing a cargo storage space). The release mechanism of positioning system 120 is configured to maintain the seat back in a selected position relative to the seat bottom (e.g. a seating position, a stowed position, etc.). According to a preferred embodiment, first actuator 123 is intended to permit a user to position the seat back from a side location of the vehicle (e.g. through a side door, sliding door, adjacent seat within the vehicle, etc.). First actuator 123 is shown as a pivotally-operated handle located near a top corner of a back panel of seat back 114, and is configured to engage the release mechanism (e.g. for a seat-pivoting device of a conventional type) so that the seat back is locked in position when the release mechanism is in a first position (e.g. "locked," "recessed," etc.) and to release the seat back for pivotal movement of the seat back when the release mechanism is in a second position (e.g. "released," "extended," etc.). The location of first actuator 123 near an upper corner of the seat back permits the seat back to be conveniently positioned by a user from the side of the vehicle or from a laterally adjacent seat within the vehicle. According to alternative embodiments, the actuators may be any suitable device such as a slide-type device or a rotary-type device, and may be located on a side panel of the seat back or other suitable location.

Referring further to FIGS. 4-6, second actuator 124 permits a user to position seat back 114 from a rear location of the vehicle. Actuator 124 is located near a lower portion of seat back 114 so that it is conveniently accessible to a user from the rear of the vehicle (such as through an open tailgate, lift gate, etc.). Actuator 124 includes a handle device 126 (shown as a "stirrup," handle device or grip member) positioned near a lower portion of seat back 114 and coupled to a first end of a flexible extension member (e.g. cord, etc. and shown schematically as a strap 128) that is configured for positioning within a corresponding recess 130 (e.g. pocket, storage area, etc.) on a back panel of seat back 114. A second end of strap 128 is configured to engage the release mechanism when the user lifts or pulls on handle device 126. A user at the rear of the vehicle may release the seat back and move the seat back from the stowed position to the seating position by grasping handle device 126 and pulling, so that the release mechanism is actuated and seat back 114 may then be rotated upward from the stowed position to the seating position using the handle device and the strap. When the seat back is returned to the desired seating position, the user releases the tension in strap 128 and the release mechanism locks the seat in position. Handle device 126 may then be returned to the storage position within the recess. Referring to FIG. 4, a handle retention system is provided to return handle device 126 to recess 130 when a user completes repositioning of the seat back. The handle retention system includes a spring device shown as a rotary retraction device 132 (spring-loaded coil, spool, take-up reel, recoil device, etc.) and a cord 134. Cord 134 has a first end coupled to handle device 126 and a second end coupled to rotary retraction device 132 having a torsion spring or the like, which is configured to permit handle device 126 to be removed from recess 130 and to retract cord 132 to return and retain position handle device 126 within recess 130.

According to a preferred embodiment, the handle device is made from plastic, but may be made of other suitable materials. According to an alternative embodiment, the flexible member may be any suitable device, such as a cord, rope, cable, etc. and made of any suitable material and provided in any desired color to complement or contrast with the trim of the vehicle. According to another alternative embodiment, the gripping member may be retained within the recess by a snap-fit, interference or frictional fit or other suitable retention configuration.

Referring to FIG. 7-9, a seating system for a vehicle is shown according to a further embodiment. The seating system includes a seat bottom 212, a seat back 214, and a positioning system 220. Positioning system 220 includes a release mechanism (e.g. recliner, latch, catch, lever, etc.), a first actuator 223 (shown as a handle member) and a second actuator 224 (shown schematically as a gripping member or handle device 226). Seat back 214 is pivotally coupled to seat bottom 212 for movement between a generally upright seating position and a generally horizontal storage position (such as for providing a cargo storage space). The release mechanism of positioning system 220 is configured to maintain seat back 214 in a selected position relative to seat bottom 212 (e.g. a seating position, a stowed position, etc.). According to a preferred embodiment, first actuator 223 permits a user to position the seat back from a side location of the vehicle (e.g. through a side door, sliding door, laterally adjacent seat, etc.). First actuator 223 is shown as a pivotally-operated handle located near a top corner of a back panel of seat back 214, and is configured to engage a release mechanism (e.g. to a seat-pivoting device of a conventional type) so that the seat back is locked in position when the release mechanism is in a first position (e.g. "locked," "recessed," etc.) and to release the seat back for pivotal movement of the seat back when the release mechanism is in a second position (e.g. "released," "extended," etc.). The location of first actuator 223 near an upper corner of seat back 214 is intended to permit the seat back to be conveniently positioned by a user from the side of the vehicle or from a laterally adjacent seat. According to an alternative embodiment, the actuator may be any suitable device such as a slide-type device or a rotary-type device, and may be located on a side panel of the seat back or other suitable location.

Referring further to FIGS. 7-9, second actuator 224 permits a user to position the seat back from a rear location of the vehicle, according to a preferred embodiment. Actuator 224 is located near a lower portion of seat back 214 so that it is conveniently accessible to a user from the rear of the vehicle (such as through an open tailgate, lift gate, etc.). Actuator 224 includes a handle device 226 (shown as a "stirrup" or gripping member) positioned near a lower portion of seat back 214 and coupled to a first end of an extension member (shown schematically as a substantially rigid lever 228) that is configured for positioning within a corresponding recess (e.g. storage position, depression, etc.) on a back panel of seat back 214. A second end of lever 228 is coupled to an upper end of seat back 214 and is biased by a spring mechanism (not shown) that is configured to return lever 228 and handle device 226 to a stored position with a recess 230. The second end of lever 228 also includes a suitable recess to accommodate first actuator 223, so that when handle member 226 and lever 228 are lifted, the first actuator 223 is engaged to activate the release mechanism.

A user at the rear of the vehicle may release the seat back and move the seat back to the seating position by grasping handle device 226 and lifting, so that the pivotal movement of lever 228 actuates the first actuator and releases the release mechanism and the seat back may then be pulled with the handle device and lever from the stowed position to the seating position. When the seat back is return to the desired seating position, the user releases the handle device which is returned to its storage position by the spring mechanism or device such as a coil spring or torsion spring (not shown). According to any preferred embodiment, the handle device and lever are made from plastic, but may be made of other suitable materials and provided in any desired color to complement or contrast with the trim of the vehicle. According to an alternative embodiment, the handle device and lever may be retained within the recess by a snap-fit, interference or frictional fit or other suitable retention configuration.

According to any preferred embodiment, the seating system for a vehicle is intended to provide a vehicle seat with a positioning system that is easily and conveniently accessible to a wide variety of users from a location along either the side of the vehicle or from the rear of the vehicle.

It is important to note that the construction and arrangement of the elements of the seating system and positioning system provided herein is illustrative only. Although only a few exemplary embodiments of the present invention have been described in detail in this disclosure, those skilled in the art who review this disclosure will readily appreciate that many modifications are possible in these embodiments (such as variations in actuator types, handle or grip contours, release mechanisms, extension member materials, shape and size, mounting arrangements, rotational and pivoting arrangements, use of colors, combinations of shapes, etc.) without materially departing from the novel teachings and advantages of the invention. Further, the seating system may be used in any type of vehicle such as trucks, recreational vehicles, minivans, sport utility vehicles, passenger automobiles, boats, etc. Accordingly, all such modifications are intended to be within the scope of the invention as defined in the appended claims.

The order or sequence of any process or method steps may be varied or resequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed in the appended claims.

What is claimed is:

1. In a seating system for a vehicle having a seat bottom and a seat back interconnected in a pivoting manner so that the seat back is configured for movement between a generally upright seating position and a generally horizontal stowed position, the improvement comprising:

a positioning system configured to move the seat back between the seating position and the stowed position and configured for actuation by a user from a rear portion of the vehicle, the positioning system including a first actuator configured to permit movement of the seat back between the stowed position and the seating position, wherein the first actuator comprises a handle member disposed proximate an upper corner of the seat back, and a second actuator coupled to the first actuator with an elongated connection member and configured to actuate the first actuator to permit movement of the seat back, wherein the second actuator comprises a handle device disposed proximate a lower corner of the seat back; and
a rotary retraction device having a torsion spring including a cord configured to return the handle device to a stowed position.

2. The seating system of claim 1 further comprising a spring member coacting with the seat back and configured to bias the seat back to the seating position when the release mechanism is in the released position.

3. The seating system of claim 1 wherein the handle member is configured for pivotal movement.

4. The seating system of claim 1 wherein the handle device is coupled to a flexible member configured to engage the first actuator.

5. A positioning system for moving a seat back in a vehicle between a seating position and a cargo storage position, comprising:
   a release mechanism actuatable between a first position to permit movement of the seat back and a second position to prevent movement of the seat back;
   a first actuator disposed on the seat back proximate an upper corner of the seat back;
   a second actuator disposed on the seat back proximate a lower corner of the seat back and coupled to the first actuator with an elongated connection member, wherein the second actuator is returned from a use position to a stowed position by a rotary spring mechanism having a torsion spring including a cord; and
   so that the seat back can be moved from the cargo storage position to the seating position by a person actuating the first actuator from a location alongside the vehicle and by a person actuating the second actuator from a location behind the vehicle.

6. The positioning system of claim 5 wherein the first actuator is a pivotally actuated handle member.

7. The positioning system of claim 6 wherein the second actuator comprises a substantially flexible member coupled to a gripping member and an upper portion of the seat back.

8. The positioning system of claim 5 wherein the first actuator and the second actuator are at least partially recessed within a rear surface of the seat back.

9. The positioning system of claim 5 wherein the seat back comprises two seat back sections.

10. The positioning system of claim 5 further comprising a spring member configured to bias the seat back toward the seating position.

11. The positioning system of claim 5 wherein the first actuator and the second actuator are positioned on the seat back adjacent a side of the vehicle.

12. A system for moving a seat back in a vehicle between a cargo storage position and a seating position, comprising a first actuator disposed proximate an upper corner of the seat back and a second actuator disposed proximate a lower corner of the seat back and coupled to the first actuator by an elongated connection member, wherein the first actuator is configured to be actuated by a user from a side of the vehicle and the second actuator is configured to be actuated by a user from a rear of the vehicle, wherein at least one of the first actuator and the second actuator are provided in a recess of a back panel of the seat back and are extendable from the recess and retractable to the recess by a rotary torsion spring device having a retractable cord, so that the seat back may be moved from the cargo storage position to the seating position by a user located at either the side or the rear of the vehicle.

13. The system of claim 12 wherein the first actuator is a pivotally actuated handle member.

14. The system of claim 12 wherein the second actuator comprises an extension member coupled to a gripping member and an upper portion of the seat back.

15. The system of claim 14 wherein the extension member is a substantially flexible member.

16. The system of claim 12 wherein the first actuator and the second actuator are at least partially recessed within a rear surface of the seat back.

17. The system of claim 12 wherein the first actuator and the second actuator are positioned on the seat back adjacent a side portion of the vehicle.

* * * * *